Nov. 14, 1944.  C. W. MOTT  2,362,578
POWER LIFTING ARRANGEMENT
Filed June 30, 1942    2 Sheets-Sheet 2
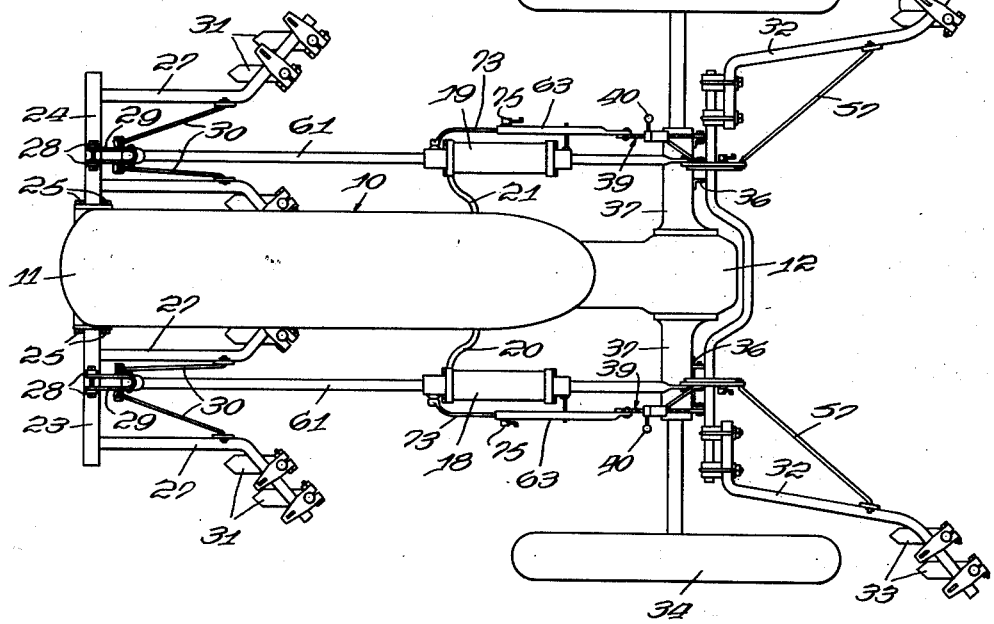
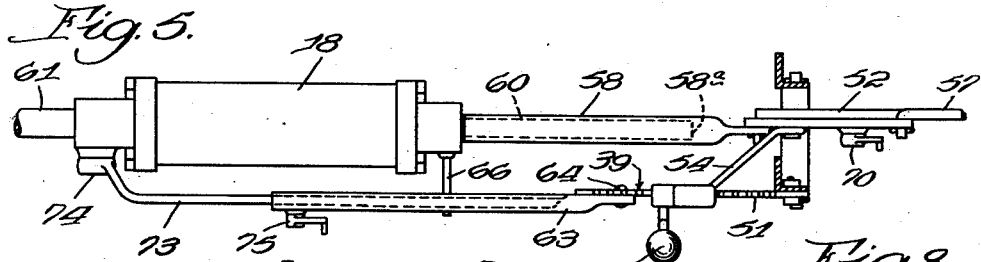
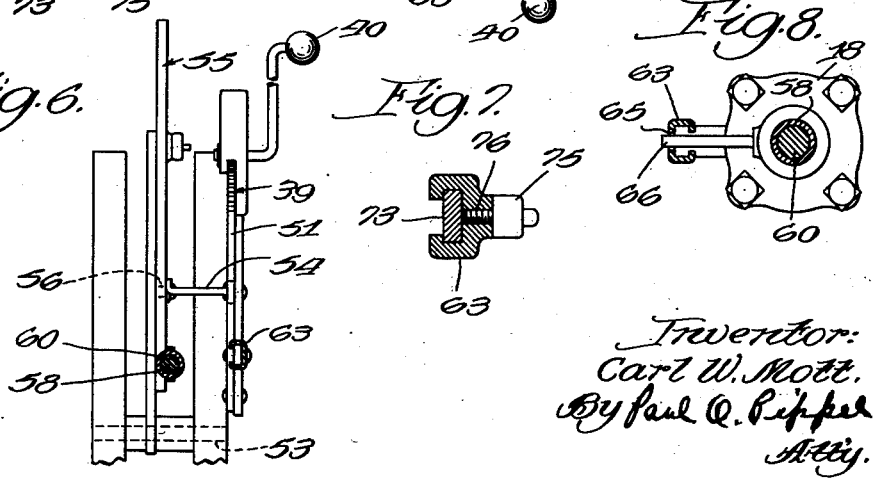
Inventor:
Carl W. Mott.
By Paul Q. Pipper
Atty.

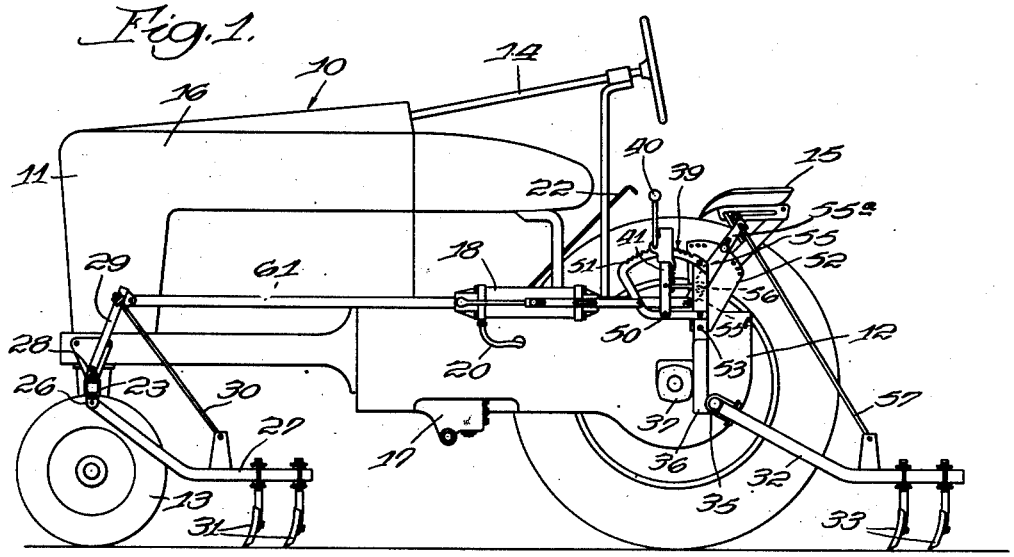

Patented Nov. 14, 1944

2,362,578

UNITED STATES PATENT OFFICE 2,362,578

POWER LIFTING ARRANGEMENT

Carl W. Mott, La Grange, Ill., assignor to International Harvester Company, a corporation of New Jersey Application June 30, 1942, Serial No. 449,089

8 Claims. (Cl. 97—50)

This invention relates to power-lifting arrangements for lifting working tools connected to tractors or other tool-supporting structures for movement to and from their working positions.

It is an object of the present invention to provide a more simple arrangement for connecting power-operated devices to the working tools connected on their tool-supporting structures for movement.

It is another object of the invention to provide a more simple arrangement for connecting power-actuating devices to the working tools mounted on a tool-supporting structure for movement, wherein automatic delayed movement of one of the tools with respect to the other of the tools may be more easily effected.

It is still another object of the invention to provide with a power lifting arrangement, means for selectively cutting off the power to any of the working tools distributed at different locations on the tool-supporting structure whereby any or all of the selected working tools may be used individually or collectively as desired.

According to the present invention, the power-operated device, which forms a part of a fluid-power arrangement deriving its original power from the motor on a tractor, is floatingly connected between working tools located respectively at different locations on the tractor for movement with respect thereto. The power-operated device is free to extend itself in two directions and upon so doing the working tools are lifted or moved from one position to another position. Incorporated in the connections of the fluid-operated device is a means for delaying the operation of one of the working tools until the other of the working tools has been moved out of its original position. This delaying means is automatic and when the other tool has been moved to its final position the power-operated device will be extended in the opposite direction to lift or move the one working tool to its new position. This delaying means includes a lever which is pivoted on a manually adjustable member so that, as this member is adjusted, the power-operated device, the lever, and the various other connections can be moved bodily to effect adjustment of the working tools in their working position.

Also included with the mechanism are various lock devices so that the tools can be selectively locked in either of their positions as the operator so desires. When any one of the working tools is locked, the other of the working tools is free to work or move independently of the one working tool.

For other objects and for a better understanding of the invention reference may be had to the following detailed description taken in connection with the accompanying sheets of drawings, in which:

Figure 1 is a view in elevation of a tractor and of the power lifting arrangements embodying the features of the present invention connected to the working tools mounted for movement on the tractor;

Figure 2 is a plan view of the tractor and illustrating the location of the working tools on opposite sides thereof and showing a pair of power-operated devices connected respectively with the working tools at the respective sides of the tractor;

Figure 3 is a detail view in elevation of the pertinent part of the power mechanism and illustrating how the power-operated device is extended to effect lifting of the working tool connected on the forward portion of the tractor;

Figure 4 is a view similar to Figure 3 after the power-operated device has extended in the opposite direction to effect lifting of the working tool at the rear portion of the tractor;

Figure 5 is an enlarged plan view of the power-operated means and portions of its connections with the working tools;

Figure 6 is a sectional view in elevation taken along the line 6—6 of Figure 4 and looking in the direction of the arrows thereof;

Figure 7 is a sectional view of the locking device for the locking of the working tools on the forward portion of the tractor and taken along the line 7—7 of Figure 4 and looking in the direction of the arrows thereof; and Figure 8 is a view partly in section showing one end of the power-operated device and the stop means thereon, and taken along the line 8—8 of Figure 4.

Referring now particularly to Figures 1 and 2, a tractor or tool-supporting frame 10 is shown having a forward portion 11 and a rearward portion 12. The forward portion 11 of the tractor is supported on dirigible wheels 13 adapted to be operated by steering mechanism 14 accessible to an operator's station 15 located on the rear portion 12 of the tractor. Since the tractor body and the supporting wheels therefor form a running gear, said body corresponds to a running-gear frame. The tractor includes a power plant 16 adapted to operate a fluid pump arrangement 17 partially mounted within the portion of the body of the tractor intermediate the forward and rearward portions thereof. This fluid pump arrangement has associated with it various valves for controlling the delivery of fluid to fluid-operated devices 18 and 19 located respectively on the left and right sides of the tractor. Delivery of fluid to these fluid devices is made, respectively, through hose couplings 20 and 21. The valves are controlled from the operator's station by means of a rearwardly extending manually operable rod 22.

To the forward portion of the tractor are connected respectively at opposite sides thereof, transversely extending tool beams 23 and 24. Since these beams are rigidly connected to the tractor at their inward ends by bolts 25, they become rigid with the tractor and form a part thereof tending to provide in its entirety a tool-supporting frame. On each of the beams are provided downwardly extending brackets 26 to which are pivotally connected cultivating ground-working tools 27. On top of these transverse beams are upwardly extending brackets 28 to which are pivoted fore and aft pivotal levers 29 connected respectively to the working tools by lifting rods 30. Each of the working tools 27 has ground-penetrating elements 31. On the rear portion 12 of the tractor are connected working tools 32, and these working tools are so arranged as to be located at opposite sides thereof for longitudinal alinement respectively with the forward working tools located at opposite sides of the forward portion of the tractor. These working tools 32 have ground-penetrating elements 33 arranged to follow, respectively, traction wheels 34 which support the rear portion of the tractor 12 for the purpose of sweeping out the tracks left by these wheels.

The connection of these working tools 32 to the rearward portion 12 of the tractor is indicated at 35 and includes a bracket 36 rigidly connected to a transversely extending axle portion 37 forming a part of the rear portion 12 of the tractor. It should now be apparent that there have been provided on the tractor working tools 27 and 32 which can be moved to and from working position and are thus respectively movable with respect to the tractor or tool-supporting frame 10.

Extending vertically from the bracket structure 36 is a manually adjustable quadrant and lever mechanism 39 adapted to be operated by a crank element 40 accessible to the operator's station 15. As the crank element 40 is rotated, a lever 41 pivoted at 50 is adjusted over a quadrant portion 51. This mechanism further includes a plate element 52 movable or pivotable about a pivot point 53 and connected with the lever 41 by means of a link 54.

On this plate 52 is pivoted a lever 55 at a pivot point 56 and adjacent a connection of the link 54 with the plate 52. As the manually adjustable means is operated, the lever 55 is bodily moved from one position to another position. The lever 55 has a long lever arm 55a and a short lever arm 55b. The long lever arm 55a is connected to the rear tool 32 by a lifting rod 57. The short lever arm 55b is connected to the fluid-operated device 18 by means of a sleeve 58. This sleeve 58 has a pivotal connection with the short lever arm 55b as indicated at 59. The fluid-operated device is of the single-acting cylinder type having a piston therein which operates a piston rod 60. This piston rod 60 extends into the sleeve 58 and engages a stop 58a therein as shown in Figure 5.

The forward end of the fluid-operated device 18 is connected with the fore and aft pivotal lever 29 by means of a push rod 61. It should now be apparent that the fluid device 18 is directly and floatingly connected between the forward tool 27 and the rearward tool 32 located respectively at different locations on the tractor and having independent movement with respect to one another and to the tractor. As the control rod 22 is operated, fluid will flow through the fluid communications 20 to the fluid-operated device 18 to thereby cause the same to be extended. The arrangement of the connections between the fluid-operated device 18 and the respective tools 27 and 32 is such that power will first act on the forward tool 27. The fluid-operated device is thus extended forwardly as illustrated in Figure 3 to effect lifting of the forward working tool 27. When the power-operated device 18 has been extended in this direction about half of its stroke, further forward movement is prevented by a forwardly extending strap element 63 connected at 64 to the quadrant 51 of the manually adjustable mechanism. This strap element 63 has a slot 65 into which extends a round transversely extending rod 66 rigidly carried on the fluid-operated device 18 as best shown in Figure 8. As the fluid-operated device travels forwardly, the rod 66 will slide in the slot 65 thereby permitting movement of the fluid-operated device until such time as it reaches the forward end of the slot 65. The fluid cylinder device is then limited in its forward extended movement, but this is only after one half of the stroke has been made. Continued movement of the fluid-operated device will then be in the opposite direction and against the lever 55 to cause its rotation in a counter-clockwise direction about its pivot 56 to effect upward movement of the lift rod 57 and the working tool 32. By having the rear working tool 32 so located in its ground-working position by the arrangement of the lever 55, it will be apparent that there has been obtained by this arrangement an automatic delayed movement of the rear tool 32 with respect to the forward tool. The forward tool 27 is lifted first, leaving the rear tool 52 in its ground-working position until such time as it has traveled the full extent of the crop row or advanced to the point in the crop row at which the forward tool 27 was lifted. To effect lowering of the working tools, fluid is released from the fluid-operated device and returned to the fluid reservoir 17.

When it is desired to adjust the working tools 27 and 32 in their ground-working position, the lever 55, the fluid-operated device 18, and all its connections with the working tools are bodily moved by mere adjustment of the plate 52 about its pivot 53. This, as explained above, is effected by rotating the crank element 40 over the quadrant 51. If it is desired to lock the rear tool 32, this can be effected by locating a locking element 70 in any one of a number of holes 72 on the plate 52. By so locking the lever 55 on the plate 52, the lever will be unable to rotate as power is applied to the connection 59 on the short end of the lever.

The strap 63 is of channel section, as shown more clearly in Figures 7 and 8, in which there is slidable within its forward end a strap 73 connected to the power-operated device as indicated at 74. Should it be desired to lock the forward tool 27 in one of its positions, this is effected by a screw-locking element 75 carried by the strap 63 and threaded in an opening 76 thereof for engagement with the strap 73. When this screw 75 is tightened, the forward tool 27 will be locked and the fluid-operated device 18 will be prevented from extending in a forward direction. It should now be apparent that either the forward or rearward working tools can be separately or selectively locked without interfering with movement of one with respect to the other. While the description has been more or less confined to the arrangement as found on the left side of the tractor, it should be apparent that the arrangement as found on the right side of the tractor is similar and that the description as given applies to the same. It should also be apparent that with locking devices as arranged both of the working tools at the one side may be locked independently of the working tools at the opposite side of the tractor whereby tools at the one side of the tractor may be used independently of the tools at the other side of the tractor.

It should now be apparent that, by arranging the fluid-operated devices forming a part of the power-lifting arrangement for tractors so that the same are floatingly connected between working tools respectively connected to the tractor for independent movement, a simple arrangement for effecting delayed lifting of the rear tool with respect to the forward tool and a simple arrangement for selectively locking any one or more of the tools mounted at different locations on the tractor is readily had.

While various changes may be made in the detail construction, it shall be understood that such changes shall be within the spirit and scope of the present invention as defined by the appended claims.

What is claimed is:

1. In combination in an earth-working implement, a running-gear frame, a first earth-working tool, a second earth-working tool, said tools being respectively connected to the frame for movement with respect thereto, an expansible motor unit floatingly connected between the working tools and energizable to extend itself to effect movement of the working tools, means for effecting delayed movement of one of the working tools with respect to another working tool including means associated with the one tool for preventing its movement while the power-operated device is extended throughout a part of its stroke in one direction, and means for stopping further extension of the motor unit in the one direction to cause the extension of said unit in the opposite direction whereby movement of the one tool is finally effected.

2. In combination in an earth-working implement, a running-gear frame, earth-working tools respectively connected to said frame for movement from one position to another position, a motor device, means for floatingly connecting the device between the working tools to move the same upon the device being energized, said connecting means including a lever, manually adjustable mechanism on the tool-supporting frame, means for connecting the lever for pivotal movement to the manually adjustable mechanism, whereby the lever, the device, and its connections are bodily adjustable to effect simultaneous adjustment of the working tools in one of their positions.

3. In combination, in an earth-working implement, a running-gear frame earth-working tools respectively connected to the tool-supporting frame for generally downward and upward movement to and from their ground-working positions, a fluid power apparatus for lifting the ground-working tools from their ground-working positions, said fluid power apparatus including a fluid-operated motor and means for floatingly connecting the motor between the ground-working tools, said latter connecting means including a lever, manually adjustable mechanism on the tool-supporting frame including a pivotally mounted supporting member for pivotally supporting said lever whereby the same may be bodily adjusted to move said motor and its connections to thereby effect simultaneous depth adjustment of the ground-working tools in their ground-working positions.

4. In combination in an earth-working implement, a running gear-frame, earth-working tools respectively connected to the running-gear frame for movement from one position to another position, an expansible motor floatingly connected between the earth-working tools and normally free to be extended in two directions pursuant to its energization to effect movement of said tools, and means for locking the motor to the frame against extension in one direction whereby one of the working tools may be locked in one of its positions.

5. In combination in an earth-working implement, a running gear frame, earth-working tools respectively connected to said frame for movement from one position to another position, a motor floatingly connected between the said tools and energizable to extend in two directions to effect movement of said tools, means for locking the motor against extension in one direction, a second means for locking the motor against extension in the opposite direction, whereby the selective operation of one of said tools may be had independently of the operation of the other of the working tools.

6. In combination, a tractor including a tool-supporting frame having forward and rearward portions, ground-working tools respectively connected to the forward and rearward portions of the tool-supporting frame for lowering and raising movement to and from their ground-working positions, a motor floatingly disposed with relatively movable portions thereof connected to and between the ground-working tools and energizable to extend pursuant to relatively moving said motor portions in opposite directions to effect lifting of the working tools from their ground-working positions, and means for locking at least one of said motor portions to the tool-supporting frame to preclude extension of the motor in one direction whereby at least one of the ground-working tools is held against vertical movement.

7. In combination, a tractor having forward and rearward portions, working tools respectively connected to the forward and rearward portions of the tractor and on opposite sides thereof for movement from one position to another position, motors respectively floatingly connected to the working tools at the opposite sides of the tractor, each of said motors being adapted to be extended in two directions, means located at opposite sides of the tractor for respectively locking the motors to the tractor to prevent extension of the same whereby the working tools at one side of the tractor may be locked in one of their positions independently of the working tools at the opposite side of the tractor.

8. In combination, a tractor having forward and rearward portions, ground-working tools respectively connected to the forward and rearward portions of the tractor and on opposite sides thereof for lowering and raising movement between their ground-working positions and their transport positions, a fluid power apparatus for lifting the working tools including fluid-operated motors respectively floatingly connected between the working tools at opposite sides of the tractor and each of said motors being adapted to be extended in two directions when moving the working tools, means for selectively locking the motors to the tractor against their extension in either of the directions or in both directions whereby any one of the working tools may be held against movement in one of their positions independently of the other working tools or both working tools at one side may be held in their positions against movement of the working tools on the opposite side of the tractor.

CARL W. MOTT.